Dec. 12, 1950  J. A. VAN DEN BROEK  2,534,084
PROJECTION APPARATUS
Filed June 21, 1946  4 Sheets-Sheet 2
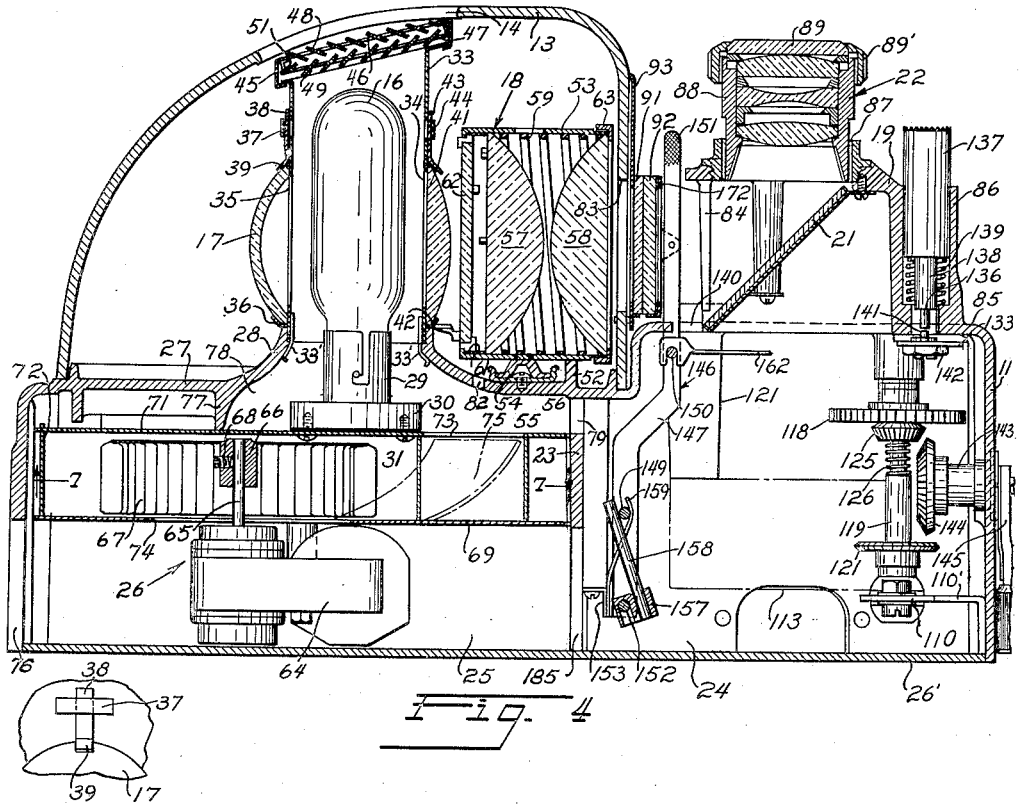
Fig. 4
Fig. 4A
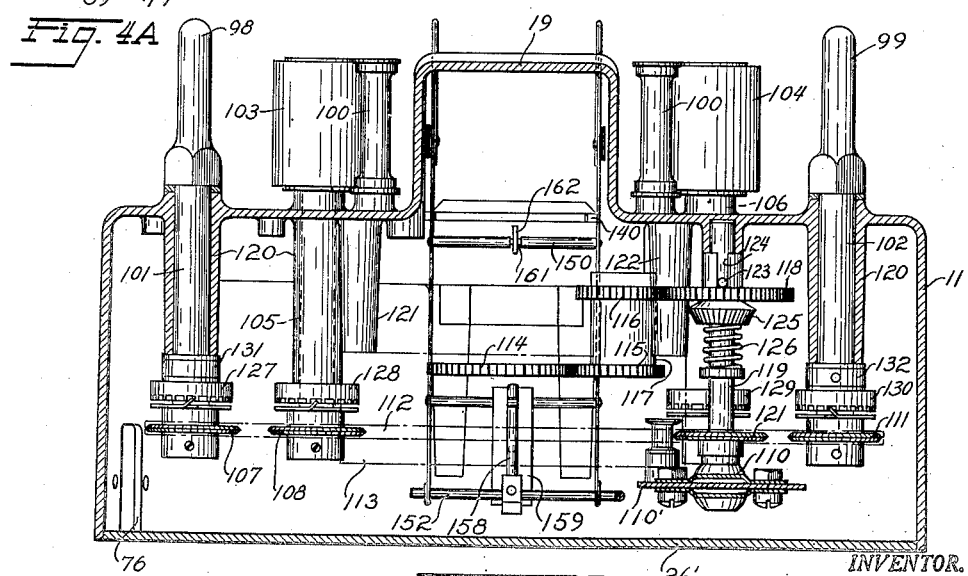
Fig. 5
INVENTOR.
JAN A. VAN DEN BROEK
BY
Strauch & Hoffman
ATTORNEYS Dec. 12, 1950   J. A. VAN DEN BROEK   2,534,084
PROJECTION APPARATUS
Filed June 21, 1946   4 Sheets-Sheet 3
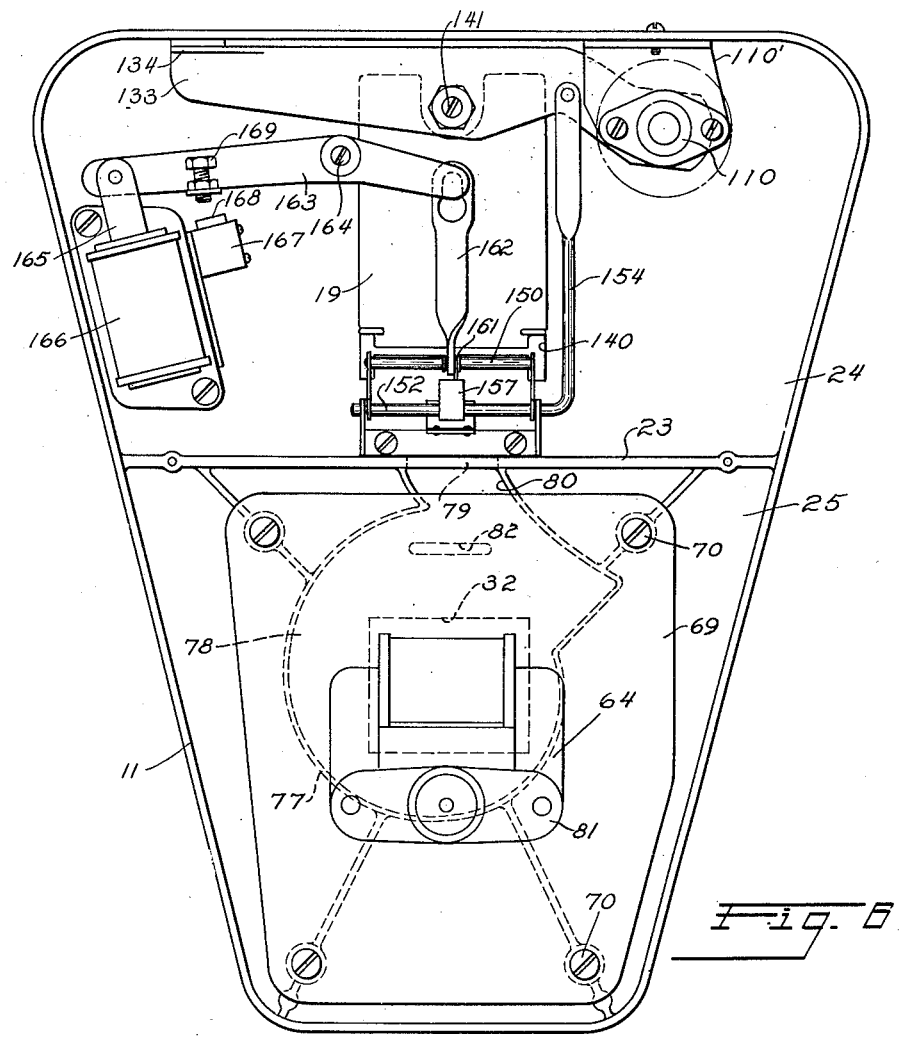
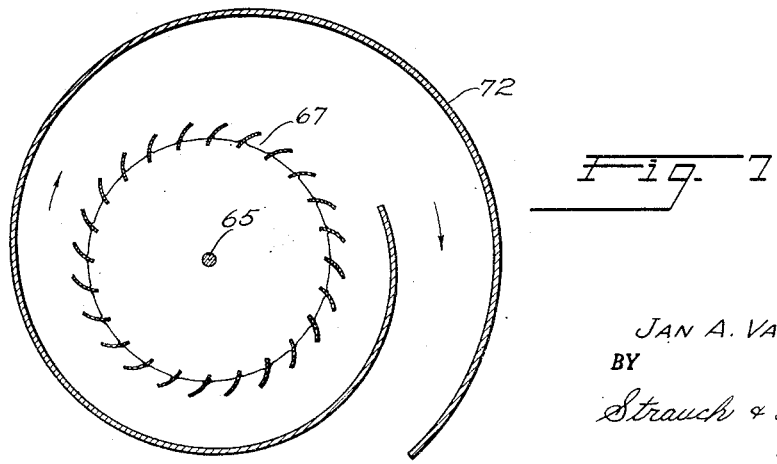
INVENTOR.
JAN A. VAN DEN BROEK
BY
Strauch & Hoffman
ATTORNEYS

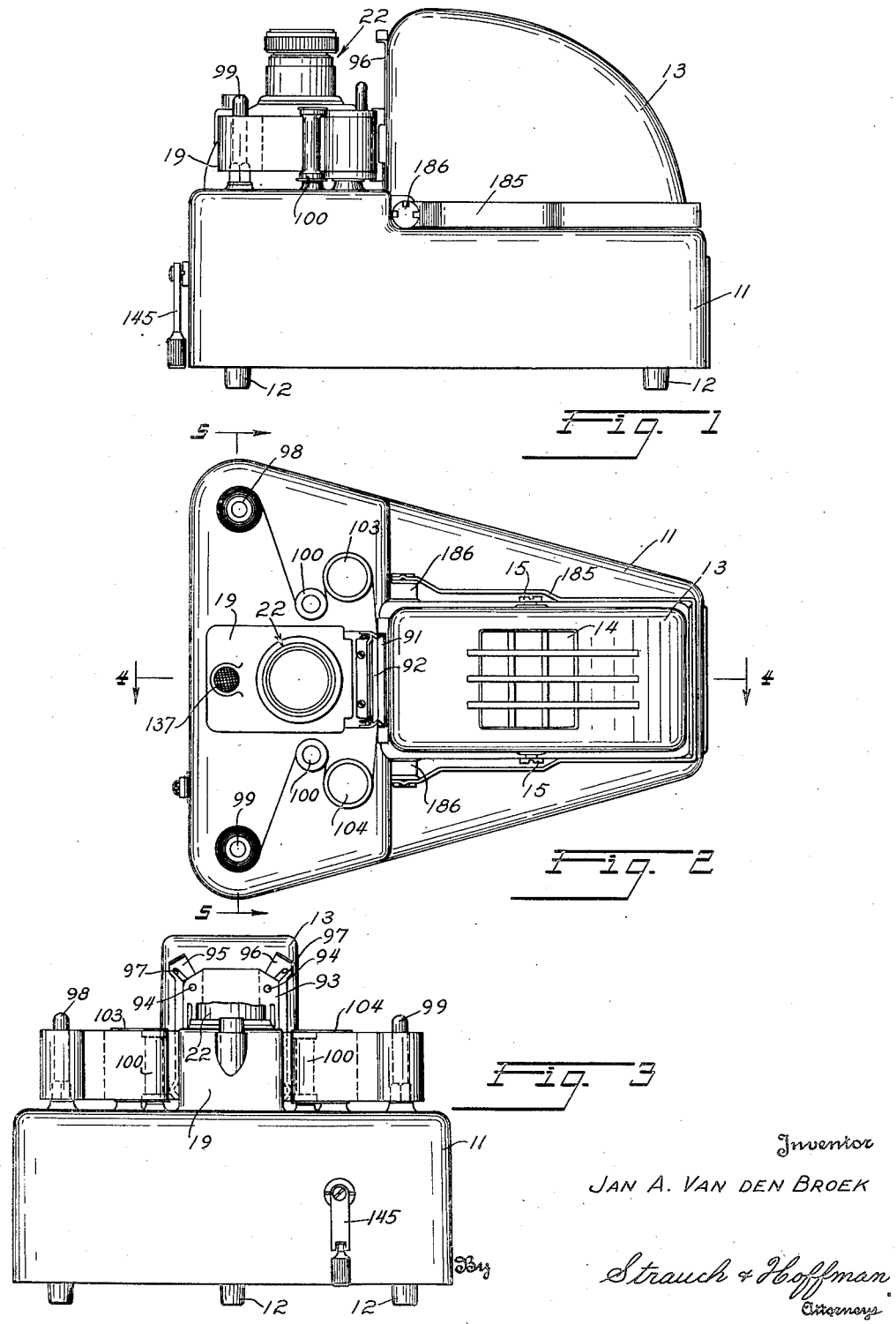

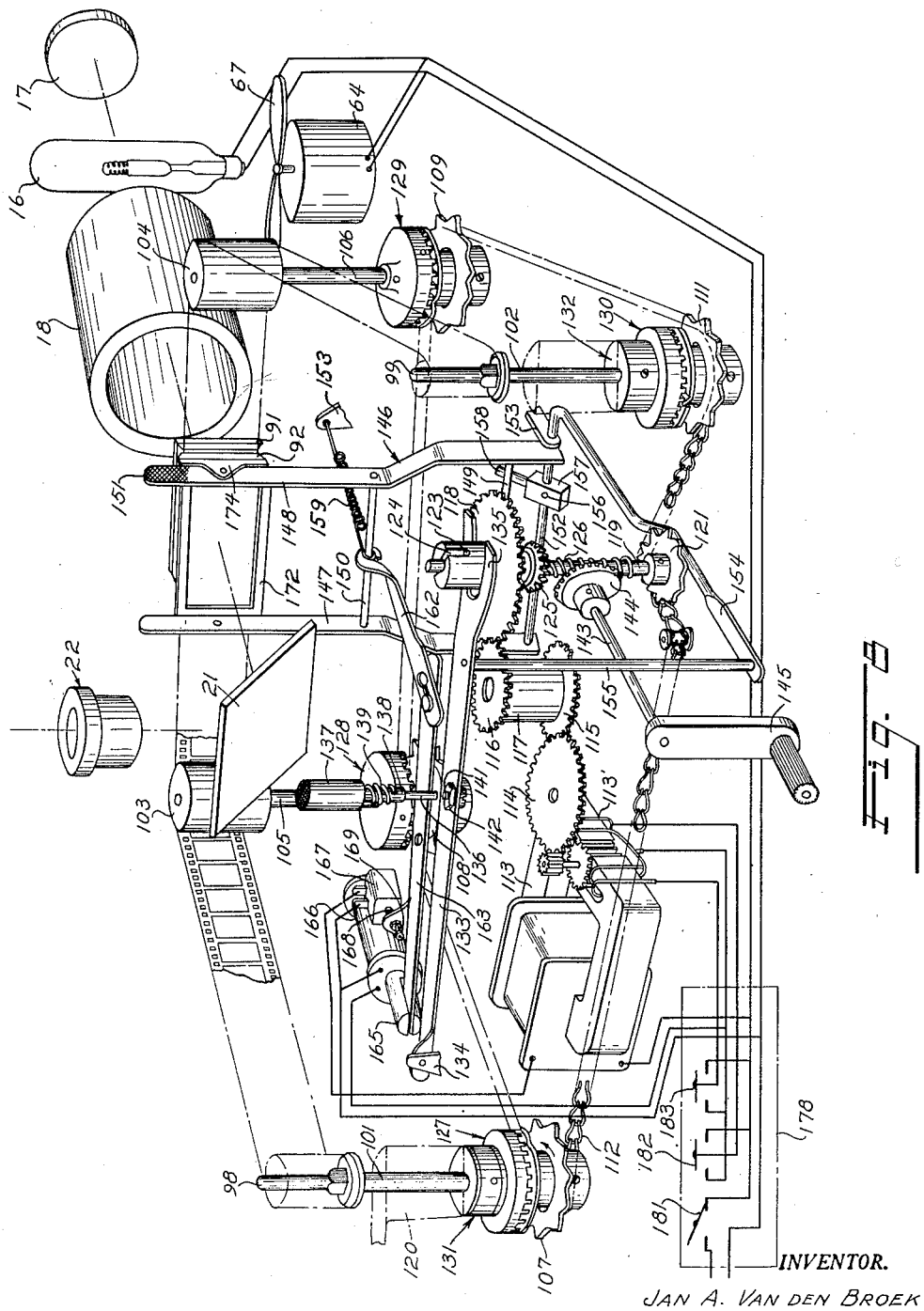

Patented Dec. 12, 1950

2,534,084

UNITED STATES PATENT OFFICE 2,534,084

PROJECTION APPARATUS

Jan A. Van den Broek, Ann Arbor, Mich., assignor, by mesne assignments, to Bradfield and Bidwell, Inc., Ann Arbor, Mich., a corporation of Michigan Application June 21, 1946, Serial No. 678,209

7 Claims. (Cl. 88—24)

This invention relates to picture projection apparatus and is more particularly concerned with the projection of so-called "still" pictures wherein a picture strip may be moved to selectively frame a picture in an optical path and maintain it there a desired length of time, as for reading or lecture purposes.

This is a continuation in part of my co-pending application Serial No. 663,135, filed April 18, 1945.

In its preferred embodiment, the invention will be described as incorporated in a projector especially designed for ceiling projection, as for projecting micro-photographed books or like pages on the ceiling of a room containing bedridden persons, but it will be understood that the apparatus is not so limited in its application.

It is therefore a major object of the present invention to provide a picture projection apparatus having a novel compartment structure for projection lamp cooling and film advancing mechanisms.

It is a further object of the invention to provide a novel compartmented projection apparatus wherein a fan and motor therefor is provided in a compartment below the projection lamp, and the drive for the film strip is mounted in a compartment below the objective lens assembly, to provide a compact assembly.

It is a further object of the invention to provide a novel projection lamp chimney and cooling arrangement in projection apparatus.

It is a further object of the invention to provide a novel cooling arrangement for the projection lamp in a picture projection apparatus.

A further object of the invention is to provide novel arrangements for cooling the film gate in a picture projection apparatus.

A further object of the invention is to provide a novel manner of mounting a light modifying element such as a reflector or a lens in a picture projection apparatus.

Further objects of the invention will presently appear as description thereof proceeds, in connection with the appended claims and the annexed drawings wherein:

Figure 1 is a side elevation of a ceiling projector illustrating a preferred embodiment of the invention;

Figure 2 is a top plan view of the projector of Figure 1 particularly illustrating the film feed path;

Figure 3 is a front elevation of the projector of Figure 1;

Figure 4 is an enlarged section taken substantially along line 4—4 of Figure 2, illustrating the projection lamp and cooling fan arrangements as well as the compartment structure within the base of the projection apparatus;

Figure 4A is a fragmentary elevation illustrating the removable reflector or lens holding clip;

Figure 5 is a section taken substantially along line 5—5 of Figure 2, illustrating further the film advancing means within the front compartment of the projector base.

Figure 6 is a bottom plan view of the projector base illustrating particularly the cooling fan motor mount in the front compartment and the automatic control for releasing the film gate in the rear compartment;

Figure 7 is a section taken substantially along line 7—7 of Figure 4 illustrating particularly the path that the cooling air follows in emerging from the blower; and Figure 8 is a substantially perspective view diagrammatically illustrating the film handling arrangements apart from the projector base structure.

Referring particularly to Figures 1–4, the ceiling projector comprises an open-bottomed base 11 adapted to be levelly supported by legs 12 on a horizontal surface such as a table, bench or hospital floor. Rearwardly, a removable lamp housing 13, formed with a grilled ventilating air outlet 14 on top and secured to base 11 as by screws 15, encloses a part of the optical system comprising an upright projection lamp 16 backed by a light concentrating reflector 17 which is optically aligned with the lamp filament and the horizontal axis of a condenser lens assembly within tube 18. Lamp 16, reflector 17 and lens tube 18 are suitably supported on base 11 as will be described further and are uncovered whenever lamp house 13 is removed.

Forwardly of lamp housing 13, base 11 is centrally provided with an integral upstanding hollow objective lens mount 19 internally containing a plane reflector 21 and carrying an objective lens assembly 22 having a vertical optical axis perpendicular to and coplanar with the optical axis of condenser lens tube 18. Lamp housing 13 and lens mount 19 are both apertured in alignment with the condenser lens to permit the projection light path.

Internally, base 11 is formed with a transverse, substantially vertical inner wall or web 23 which extends from the top wall of base 11 down to the open bottom of base 11. Wall 23 divides the interior of base 11 into a front compartment 24, wherein the film advancing and film presser plate control arrangements are mainly located as will appear, and which is open at its top to the interior of lens mount portion 19, and a rear compartment 25 that contains a blower assembly 26 suitably secured to base 11 and adapted to supply cooling air for the projection lamp and the film as will appear.

Base 11 is wholly open at its bottom, as illustrated best in Figures 4 and 6, being closed by a suitable cover plate 26', which may be removably attached to base 11 in any suitable manner, as by machine screws or the like.

The top wall 27 of base 11 is formed above rear chamber 25 with an upstanding hollow boss portion 28, through which extends the socket 29 of projection lamp 16, socket 29 in turn being rigidly mounted on a suitable support 30 removably secured as by suitable machine screws 31 to the top plate 71 of the septum assembly later to be described.

As illustrated in Figure 6, the aperture 32 defined by boss 28 is substantially rectangular. Boss 28 is formed with an internal shoulder on which is frictionally seated a rectangular lamp chimney assembly 33, which is preferably a rectangular sheet metal tube open at top and bottom and dimensioned to surround lamp 16 in spaced relation thereto. The lower end of chimney 33 is provided with depending spring fingers 33' for engaging the throat of boss 28 and holding the chimney in place. The front and rear walls of chimney 33 are apertured at 34 and 35 in optical alignment with the lamp filament and the condenser lens assembly. Just above boss 28, the rear sheet metal wall of lamp chimney 33 is formed with one or more integral outwardly bent tabs 36 for supporting the lower part of reflector 17, while above aperture 35 an integral tab 37 is bent out of the sheet metal rear wall of chimney 33 to provide a slide guide for a bowed clip 38 of spring metal. Clip 38 has an end flange 39 bent outwardly at an angle and arranged to contact the rear surface of reflector 17. Clip 38, being slidable up and down in the guide provided by tab 37, secures reflector 17 in place when in the position illustrated in Figure 4, and reflector 17 may be readily removed for cleaning and/or replacement simply by sliding clip 38 upwardly in its guide after the lamp house 13 has been removed.

This arrangement is particularly advantageous in an inexpensive construction where, if an integral tab like 36 were used in place of clip 38 to hold the upper end of the reflector, the number of times that the reflector could be removed without such a tab becoming fatigued and broken off, due to repeated flexure of the metal, is limited, and once broken off it is very difficult to repair. Hence this arrangement provides a novel, useful and very inexpensive method of maintaining the reflector 17 in its desired position on the lamp chimney.

Similarly, the rear lens element 41 of the condenser lens assembly is supported at its lower end by tabs 42 integral with the front wall of chimney 33, and at its upper end by a spring clip 43 similar to clip 38 and slidable in a tab 44 integral with the front wall of chimney 33. In this manner condenser lens rear element 41 is also removably mounted in the assembly for cleaning and repair.

The top end of chimney 33 is closed to the passage of light, but not to the passage of air, by a suitable baffle assembly comprising a rim 45 which is annular and rectangular and adapted to be suitably removably secured to the upper end of chimney 33 as by a friction fit. Within rim 45 are mounted two parallel plates 46 and 47 of sheet metal formed with staggered integral and oppositely bent transverse slat portions 48 and 49 respectively. The adjacent rows of bent slats overlap, so that these louvers form a light trap preventing exit of light through the top of the chimney and through the opening 14. Plates 46 and 47 are maintained apart by a suitable spacer ring 51. I have thus provided at the top of the lamp chimney a pair of parallel plates having opposite overlapping rows of louvers, which permit air to pass through the apertures in the plates made by bending out the louvers and out through apertures 14 in the top of the lamp housing, while trapping the light from lamp 16.

Forwardly of boss 28, upper wall 27 of the base is formed with an upstanding rib 52 which is generally U-shaped in plan so as to form a shallow trough serving as a front support for tube 18 within which is disposed the front elements of the condenser lens. Condenser lens tube 18 comprises a cylindrical cell 53 having a support projection 54 at its bottom for fitting into a spring socket 55 secured to wall 27 as by screw 56. Thus lens tube 18 is removably mounted on wall 27, and is accessible when lamp housing 13 is removed.

Cell 53 contains two planar convex lenses 57 and 58 urged apart by an expanding internal spring 59. Axial movement of lens 57 is prevented by contact of the planar surface of the lens with a retainer ring 61, which is non-rotatably secured within cell 53 and carries a planar heat absorbing filter 62 that closes the rear end of the cell.

A retainer ring 63 having an annular lip engaging the planar front surface of lens 58 maintains the cell assembled against the force of spring 59 as illustrated. It is apparent that, simply by pulling upwardly on lens tube 18, the heat filter and front part of the condenser lens assembly can be removed for cleaning and repair, and the front condenser lens assembly itself can be easily taken apart by removal of ring 63 from cell 53.

Within rear compartment 25, the cooler fan blower assembly comprises an electric motor 64 having a driven shaft 65 non-rotatably secured to the hub 66 of a sirocco-type fan 67, as by a set screw 68. The axis of shaft 65 is preferably vertical so that the fan delivers a transverse current of air and so as to accommodate the largest possible capacity fan within the available dimensions of the base and compartment 25. Fan 67 is disposed in a septum assembly that comprises a lower horizontal plate 69, an upper horizontal plate 71, and an intermediate scroll portion 72 which defines a substantially spiral path for the air delivered by fan 67, as will appear, and which is best illustrated in Figure 7. As illustrated in Figure 6, a plurality of screw fastening assemblies 70 are employed to removably mount the septum assembly on wall 27 of the base.

Upper plate 71 is apertured at 73 for upward passage of cooling air toward boss 28. Scroll 72 is rigidly secured to plates 69 and 71 as by suitable cooperating integral tabs and holes. Lower plate 69 is apertured at 74 centrally of fan 67, whereby cooling air is withdrawn from chamber 25 and passed outwardly along the path provided by scroll 72. A deflector tongue 75, preferably integral with lower plate 69, insures that the air delivered by the fan is deflected upwardly toward opening 73 without being trapped in the septum.

Base 11 is provided with a suitable aperture 76 which may be provided with a screen or filter through which cooling air is drawn during operation of fan 67, so that when electric motor 64 is driven, the fan forces cooling air from compartment 25 upwardly through boss 28 and along lamp 16 to cool the latter, and outwardly through the chimney louvers and outlet 14. The natural chimney action of the hot air assists this operation and renders the whole assembly very efficient. Preferably, as illustrated in Figure 6, the internal part of top wall 27 is formed with a depending ribbed portion 77 which is adapted to contact the upper surface of plate 71 of the septum and thereby form an upper air chamber or passage 78 which is substantially separate from the lower part of compartment 25.

Internal wall 23 of the base is formed with a suitable aperture 79 where it joins top wall 27 and this aperture 79 is in open communication with cooling air chamber 78 through a throat 80 defined by the forward portion of rib 77. The purpose of this aperture is to provide cooling air to the film gage as will appear. As illustrated best in Figure 6, the entire septum assembly is attached to suitable boss formations in the lower part of wall 27, and motor 64 is mounted on a suitable bracket 81 affixed to lower plate 69 of the blower assembly. In this manner the whole fan motor, fan and septum assembly with the lamp carried thereby may be speedily removed as a unit through the bottom of compartment 25 for any desired purpose, as repair of the motor or fan.

Upper wall 27 of the base is apertured adjacent boss 28 at 82 to provide a passage for blowing cooling air into the front portion of lamp housing 13 for cooling the heat filter and the condenser lens assembly.

Lamp housing 13 is apertured at 83 in alignment with the optical axis and with a similar aperture 84 at the rear of lens mount 19. As illustrated in Figure 4, the front section 85 of upper base wall 27 is stepped to a higher level than that supporting the lamp housing and is formed with an integral plunger receiving boss 86 on the front end of lens mount 19 which is effectively an integral upstanding formation on the wall. A suitable slide and friction connection indicated at 87 is provided between tube 88 which contains the objective lenses and a collar threaded into the apertured top of lens mount 19 for axially displacing tube 88 for varying the focus of the projected image. Above the lenses, a planar plate window 89 of glass is secured across the top of tube 88, as by ring 89′, to protect and prevent scratching of the top lens surface, and to facilitate removal of dust and dirt.

Interposed in the light path between the condenser lens and reflector 21 are two presser plates 91 and 92 having their adjacent faces perfectly flat and parallel in vertical planes. Plates 91 and 92 are preferably blocks of glass or like rigid light transparent material.

Rear presser plate 91 is fixedly mounted on lamp house 13. Lamp house 13, as above stated, has its front wall apertured at 83 in alignment with the projection axis, the aperture being of a size at least equal to the largest picture size to be positioned between plates 91 and 92. Referring to Figure 3, a suitable mounting plate 93 is fixedly supported in spaced relation to the front wall of lamp house 13, as by rivets 94. Plate 93 is formed with an aperture in alignment with the optical axis. Vertical masking blades 95 and 96 formed with inclined cam and support slots 97 are slidably mounted on rivets 94, being positioned mainly by friction in the space between plate 93 and the front wall of housing 13. Thus vertical adjustment of blades 95 and 96 controls the effective horizontal projection light aperture size to suit the picture dimensions so that variations in picture size on the film strip may be suitably compensated.

Front presser plate 92 is pivotably mounted on a swingable support illustrated in Figure 4.

The film transport system comprises generally supply and take-up spool holders 98 and 99 fixed to vertical shafts 101 and 102, identical cylindrical feed rollers 103 and 104 surfaced with rubber or like high friction material and fixed to vertical shafts 105 and 106, and the film gate comprising presser plates 91 and 92. Shafts 101, 102, 105 and 106 are rotatably mounted in hollow bosses 120 integral without base 11. Idler rollers 100 are provided on upstanding vertical axes on base 11 between each film feed roller and the film gate for guiding the film to contact a large peripheral portion of the feed rollers so as to insure a good positive friction drive of the film by the feed rollers.

Sprockets 107, 108, 109 and 111 of identical size are provided on the vertical shafts of the film spools and feed rollers all driven by a common endless chain 112. A reversible electric motor 113 having a suitable reversing winding 113′ is mounted in compartment 24 within base 11 and has its rotor connected to drive chain 112 through a gear 114 meshed with a gear on the rotor shaft, gears 115 and 116 fixed to a short vertical shaft 117 suitably rotatably mounted on base 11, gear 118, shaft 119 and a sprocket 121 on shaft 119 engaged with the chain. The lower end of shaft 119 is supported in a thrust bearing 119 on a bracket 110′ secured to the side wall of base 11. Motor 113 is secured by suitable fastening means to integral depending posts 121 and 122 within compartment 24. Bearing 110 is a universal mount.

Gear 118 is axially slidable with respect to shaft 119 and non-rotatably connected thereto, as by a pin 123 and slot 124 connection between the gear hub and shaft. Below gear 118, its hub has rigid therewith a bevel gear 125, and a coiled compression spring 126 surrounding shaft 119 reacts between the lower end of shaft 119 and gear 125 to normally bias slidable gear 118 into its illustrated upper position where it is in driving engagement with gear 116, a suitable stop being provided if desired to limit upward movement of gear 118. Thus normally when motor 113 is energized the sprockets are all simultaneously rotated in the same direction and at the same peripheral speed.

Sprockets 107—111 are connected to their respective shafts by similar resilient toothed one-way clutch assemblies indicated as 127, 128, 129 and 130, and clutches 127 and 130 on the film supply and take-up shafts also include friction couplings 131 and 132 interposed between sprockets 107 and 111 and the respective shafts. The function of clutches 127—130 is to provide reversible drive for the film. Friction couplings 131 and 132 are identical, and resilient toothed drive clutch assemblies 127—130 are also substantially identical in structure.

Details of construction of one-way drive clutches 127—130 and friction couplings 131 and 132 are described and claimed in said Serial No.

663,135 to which reference is made by way of illustration, if necessary, for these features. Insofar as the present invention is concerned, these details are not important and any suitable clutches and couplings may be provided. It is believed sufficient, to understand this aspect of the invention, to note that the film may be driven in either direction at constant speed through the film gate when its drive is energized, the friction couplings serving to compensate for changing film roll diameters.

Optionally with drive by motor 113, the film may be reversibly fed by manual operation. A lever 133, pivoted about a horizontal axis on a lug 134 rigid with base 11, is formed with a forked end 135 embracing the hub of gear 118. A vertical plunger 136, having its operating head 137 projecting upwardly through boss 86 in lens mount 19, is slidable within a stationary sleeve 138 and biased upwardly by a coiled compression spring 139 so as normally to be slightly spaced from an abutment 141 on lever 133. Abutment 141 is preferably a screw locked by a nut 142 in such adjusted position as to cooperate best with plunger 136. A horizontal shaft 143 is journalled in base 11 with a bevel gear 144 fixed upon its inner end and a handle 145 affixed thereto outside base 11.

When the operator desires to move the film manually instead of by motor 113, he depresses plunger 136, thereby rocking lever 133 downwardly and disengaging gears 116 and 118, and engaging bevel gears 125 and 144 so that rotation of handle 145 will rotate sprocket 121 to drive chain 112. Upon release of head 137, springs 126 and 139 force the parts to the motor drive position illustrated in Figure 5.

Movable pressure plate 92 is mounted on a swingable frame 146 best illustrated in Figures 4 and 8. Provision is made for automatically separating plates 91 and 92 to release and permit movement of the film whenever the film drive is actuated either manually or by motor 113. I have also arranged to separate plates 91 and 92 a short time prior to each driven movement of the film so as to synchronize the film release and drive means and insure against injury to the film.

Support 146 comprises parallel vertical arms 147 and 148 maintained together in spaced relation by rigid cross bars 149 and 150 below the front top wall 85 of base 11 as illustrated in Figures 4 and 5. As also illustrated in Figures 5 and 8, arms 147 and 148, which are strips of flexible metal, are divergingly bent at a point just above their fixed interconnection at bar 150 and are provided with knurled outer surfaces 151 adapted to be gripped by an operator's fingers for a purpose to appear. Support frame 146 projects through an H-shaped aperture 140 in base wall 85, this aperture permitting rocking movement of the support as well as movement of arms 147 and 148 toward each other for a purpose to appear.

Support frame 146 at its lower end is rotatably supported on a horizontal cross rod 152 which in turn is rotatably journalled on the spaced legs of a U-shaped bracket 153 suitably rigidly mounted on wall 23 as illustrated in Figure 4. Rod 152 is provided with a forwardly extending portion 154 secured at its front end to an upright member 155 depending rigidly from lever 133 so that, when lever 133 is rocked downwardly by depression of plunger 136, rod 152 is concomitantly rocked counterclockwise. Rigidly secured to rod 152 as by set screw 156 is a block 157 carrying a pin 158 adapted to contact cross bar 149. Support frame 146 is resiliently biased counterclockwise (toward closed portion of the plates 91 and 92) by a spring leaf 159 riveted at one end to stationary bracket 153 and bearing at its upper end against bar 149 on the opposite side from pin 158. Spring 159 is bifurcated to frictionally embrace but permit relative movement with pin 158, and it serves to locate and secure shaft 152 against axial displacement.

Thus, when rod 152 is rocked by depression of plunger 136, contact of pin 158 with bar 149 rocks frame 146 clockwise about the axis of rod 152 in Figure 4 against the bias of spring 159, and spring 159 returns the frame when the plunger is released. This is a manual arrangement for separating the presser plates 91 and 92 at the time the manual film drive is established.

Cross bar 150 is formed with a groove 161 over which is hooked the end of an arm 162 pivoted to an actuating lever 163 which in turn is intermediately pivoted about a stationary vertical axis pivot 164 provided on the bottom of wall 85 and pivotally connected at its further end to the reciprocable armature 165 of a solenoid 166. A normally open control switch 167 is mounted in the field circuit of motor 113. A switch button 168 of switch 167 is located for abutment by an adjustable stop screw 169 carried by lever 163 for control synchronization as will appear. Frame 146, as above pointed out, is biased toward closed position of plates 91 and 92 by spring 159, so that during all periods when solenoid 166 is deenergized and plunger 136 released, spring 159 holds the film presser plates closed tightly. Spring 159 and bracket 153 are illustrated diagrammatically in Figure 8.

Plate 92 is rigidly clamped in a sheet metal frame 172 having side and bottom flanges bent over the beveled edges of plate 92. At opposite sides, frame 172 is provided with integral parallel tabs 174 bent at right angles to plate 24 and formed with alignment circular apertures, each of outwardly diverging conical form and adapted to frictionally fit over similarly shaped conical support and pivot pins on arms 147 and 148 respectively. This construction is illustrated and described in detail and claimed in said Serial No. 663,135.

In order to mount frame 172 on support 146, the operator grips knurled portions 151 between his thumb and forefinger to flex the upper ends of arms 147 and 148 toward each other and decrease the distance between the tapered pins until tabs 174 can be slipped past the outer ends of the latter to align the apertures therein with the pins. Then the resilient arms 147 and 148 are released, permitting them to flex outwardly expandingly and insert the pins into the associated apertures and thus hold frame 172 on support 146. The top of frame 172 is open to permit insertion and removal of glass plate 92.

Frame 172 is thus swingably mounted about a horizontal axis parallel to the film path. The resilient biasing force of arms 147 and 148 and the conical pivot surfaces coact to provide a friction pivot connection such that, when the plate 92 is initially swung to clamp a film between it and plate 91, plate 92 assumes a position parallel to plate 91 and is retained there by the friction at the pivots. This arrangement also provides for ready removal and replacement of plate 92 in addition to the automatic alignment feature.

The usual 110 volt power line is connected through a selector switch assembly 173 to motor 113, solenoid 166, switch 167, lamp 15 and fan motor 64. In assembly 178, a first snap switch 181 is adapted to immediately close the circuits of lamp 16 and fan motor 64. Normally open push-button switches 182 and 183 control operation and direction of the film feed at the operator's will. When switch 182 is closed, the circuits of solenoid 166 and one side of reversing winding 113' are closed, and the circuit of motor 113 is closed except for switch 167. Energization of solenoid 166 retracts armature 165 to rock lever 163 which, through arm 162, rocks support 146 and plate 92 to release the film at the aperture. The spacing of abutment 169 and switch button 168 is such that switch 167 is not closed until plates 91 and 92 are appreciably separated so that motor 113, which starts when switch 167 is closed, does not start to drive the selected film spool and feed roller until after the film has been released at the film gate. Switch 183 effects the same control except that it energizes the other side of the reversing winding and causes movement of the film opposite to that effected by switch 182.

In practice, switch assembly 178 is a unit connected to the projector by a flexible cord so that a patient, for example, in a hospital bed may, with the projector on the floor beside him, control movement and direction of the film by manipulating buttons at 182 and 183 after switch 181 has been turned to "on" position.

Switch 167 thus provides automatic sequential opening of the film gate and actuation of the film drive when motor 113 is the source of power. When the film is manually driven, this sequential operation is obtained by the action of pin 158 contacting bar 149 to rock frame 146 to open the film gate whenever plunger 136 is depressed. The film is now released for movement through rotation of handle 145.

I have therefore provided a novel projector wherein the parts are efficiently compartmented for protection, ease of access for removal for repair and cleaning, and for providing a unit of such size as to be readily portable. The cooling fan assembly within rear compartment 25 is mounted removably on base 11, as are the film drive and presser plate mount members within front compartment 24. Removal of cover 26' exposes both front and rear compartments for access and inspection.

Cooling air from the blower assembly of compartment 25 is not only circulated past lamp 16 and the condenser lens assembly within lamp housing 13, but is also forced through apertures 79 and 140 to cool the film and the presser plate assembly. The exhaust air passing through aperture 83 also helps to keep the film gate cool.

The projector is portable and may be readily shifted about by means of a U-shaped handle 185 mounted on horizontal pivots 186 on base 11 and adapted to swing over lamp housing 13 as illustrated in Figures 1 and 2.

If desired wall 23 may be omitted entirely or provided with a large aperture as at 185' in Figure 4. In such event no air admitting aperture need be provided in the outer wall of compartment 25 and the action of the blower assembly is to draw in air past the film gate through opening 140 to be supplied through aperture 185' to compartment 25. From compartment 25 the air is blown upwardly as before through boss 28 and aperture 82 to cool the interior of housing 13. In such an arrangement the coolest air traverses the film gate, and if opening 140 is not large enough suitable auxiliary apertures can be provided in the outer walls of compartment 25. Where wall 23 is entirely omitted suitable rigid supports for the mechanism within the base are of course provided.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a projection apparatus, a hollow base, a top wall on said base, a projection lamp and condenser lens assembly mounted on said wall, a housing mounted on said base covering said lamp and condenser lens assembly, an upstanding objective lens mount on said wall, said housing and lens mount being apertured in substantially horizontal alignment, an objective lens assembly on said lens mount with its axis substantially vertical, means defining a film gate between said housing and said lens mount, means in said lens mount for deflecting light from the lamp and condenser lens assembly upward through said objective assembly means for advancing film through said film gate, cooling air supply means mounted within said base below the lamp and condenser lens assembly, and drive means for said film advancing means mounted within said base.

2. In a projector, a base separated into front and rear compartments, a top wall on said base having a front part extending over said front compartment and formed with an upstanding portion providing an objective lens mount, an objective lens assembly on said mount with its axis vertical, means on the rear part of said wall providing a lamp and condenser lens system having a horizontal axis, means defining a film gate mounted between said condenser lens system and said objective lens mount, means between the film gate and objective lens assembly for deflecting light from said lamp and condenser lens system upwardly through said objective lens assembly, and means for advancing a film strip through said film gate comprising a pair of film spool holders also mounted on vertical axes on the front part of said wall at opposite sides of the film gate, and means in said front compartment for selectively driving either of said adjacent spool holders for advancing the film in either direction through said film gate.

3. In the projector defined in claim 2, said film gate comprising a swingable presser plate pivotally supported within said front compartment and extending upwardly through an aperture in said wall, a housing on said wall enclosing said lamp and condenser lens assembly and having a side opening, and a cooperating stationary presser plate mounted on said housing over said aperture above said wall.

4. In a projection apparatus, a base member having an open bottom and a top wall, means on the front part of said wall forming an integral upstanding hollow portion which is apertured at its rear side and at its top, an upstanding lamp housing on said wall apertured in alignment with said side aperture, a lamp and condenser lens having a horizontal axis enclosed by said housing, means mounting an objective lens at the top opening in said hollow portion, and means mounting a reflector in said hollow portion for directing projection light upwardly through said objective lens.

5. In the projection apparatus defined in claim 4, said base having a drive mechanism compartment below the front part of said wall, and said compartment opening at its top to said hollow portion.

6. In projection apparatus, a base having front and rear compartments and a top wall overlying said compartments, means mounting a lamp and a condenser lens assembly on said wall above one of said compartments, a housing mounted on said base and extending over said lamp and condenser lens assembly, a cooling air blower assembly mounted in said one compartment, said wall being apertured to permit passage of said cooling air upwardly into said housing for cooling said lamp and condenser lens assembly and said housing being apertured for exhaust of said heated air, means mounting an objective lens assembly above the other of said compartments in optical alignment with said condenser lens assembly, and means between said lens assemblies for advancing and maintaining a film to be projected.

7. In a projector, a base having an internal wall separating it into front and rear compartments, a blower assembly mounted in said rear compartment, and a top wall on said base cooperating with said blower assembly to provide a chamber into which air from said blower is delivered, said top wall being apertured to supply cooling air from said chamber to a projection lamp and lens assembly thereabove, and means providing a film gate on said wall forwardly of said projection lamp and lens assembly, said internal wall being apertured to provide for passage of cooling air into said front compartment and said top wall being apertured for discharge of air from said front compartment past said film gate.

JAN A. VAN DEN BROEK.

REFERENCES CITED

The following references are of record in the file of this patent:

UNITED STATES PATENTS

| Number | Name | Date |
|---|---|---|
| 925,326 | Gilmore | June 15, 1909 |
| 961,947 | Fulgora et al. | June 21, 1910 |
| 1,656,389 | Nothstine | Jan. 17, 1928 |
| 1,666,305 | Proctor | Apr. 17, 1928 |
| 1,717,838 | Decker | June 18, 1929 |
| 1,919,595 | Owens | July 25, 1933 |
| 1,952,249 | Halloran | Mar. 27, 1934 |
| 1,966,531 | Tint | July 17, 1934 |
| 2,113,578 | Draeger | Apr. 12, 1938 |
| 2,128,868 | Weller | Aug. 30, 1938 |
| 2,160,890 | Mulch | June 6, 1939 |
| 2,177,638 | Draeger | Oct. 31, 1939 |
| 2,246,412 | Newman | June 17, 1941 |
| 2,281,988 | Osterberg et al. | May 5, 1942 |
| 2,294,219 | Woermann | Aug. 25, 1942 |
| 2,344,263 | Perkins | Mar. 14, 1944 |